United States Patent [19]

Venkatesh et al.

[11] Patent Number: 4,661,953
[45] Date of Patent: Apr. 28, 1987

[54] ERROR TRACKING APPARATUS IN A DATA PROCESSING SYSTEM

[75] Inventors: Venkatramiah Venkatesh, Milpitas; Robert M. Maier, San Jose, both of Calif.

[73] Assignee: Amdahl Corporation, Sunnyvale, Calif.

[21] Appl. No.: 907,131

[22] Filed: Sep. 12, 1986

Related U.S. Application Data

[63] Continuation of Ser. No. 790,179, Oct. 22, 1985, abandoned, which is a continuation of Ser. No. 527,173, Aug. 26, 1983, abandoned.

[51] Int. Cl.⁴ ............................................. G06F 11/00
[52] U.S. Cl. .................................... 371/16; 371/5; 371/29
[58] Field of Search .................. 371/5, 10, 16, 29, 18, 371/20, 21; 364/200, 900

[56] References Cited

U.S. PATENT DOCUMENTS

| | | | |
|---|---|---|---|
| 3,704,363 | 11/1972 | Salmassy | 371/29 |
| 3,838,260 | 9/1974 | Nelson | 371/16 |
| 3,906,200 | 9/1975 | Petscharer | 371/5 |
| 3,917,933 | 11/1975 | Scheuneman | 371/5 |
| 4,062,061 | 12/1977 | Batchelor | 371/16 |
| 4,453,213 | 6/1984 | Romagasa | 371/16 |
| 4,454,583 | 6/1984 | O'Brien | 371/16 |
| 4,456,994 | 6/1984 | Segarra | 371/16 |
| 4,497,057 | 1/1985 | Kato | 371/16 |
| 4,499,581 | 2/1985 | Miazga | 371/16 |

*Primary Examiner*—Michael R. Fleming
*Attorney, Agent, or Firm*—Fliesler, Dubb, Meyer & Lovejoy

[57] ABSTRACT

Disclosed is an error-tracking unit within a data processing system. Each data location to be checked for error and to be located in the case of an error is provided with error detection circuitry. Each data location is additionally provided with an error history register for storing an error signal. When the error-detecting circuit detects an error, the error history register is enabled to store the error signal. Whenever an error is detected, the error history registers are inhibited from further change so that errors are not propagated. The error detection also causes a machine check signal which, in general, prevents the data processing system from normal processing.

6 Claims, 6 Drawing Figures

FIG.—4

ERROR TRACKING APPARATUS IN A DATA PROCESSING SYSTEM

This application is a continuation of U.S. patent application Ser. No. 790,179 filed Dec. 22, 1985, now abandoned, which in turn is a continuation of U.S. patent application, Ser. No. 527,173 filed Aug. 26, 1983, now abandoned.

BACKGROUND OF THE INVENTION

The present invention relates to the field of data processing systems and more particularly to error detection and error location apparatus within data processing systems.

In large data processing systems, the location of the circuits causing errors is a difficult task. One difficulty is that the data changes each cycle of the machine. Once an error is made, the error tends to become propagated to different locations throughout the machine. In each subsequent cycle after the error-causing cycle, the original error frequently causes many more errors. This propagation and proliferation of errors tends to mask the data location which originally caused the error.

One error checking and locating mechanism is described in U.S. Pat. No. 4,132,243, entiled "Data Processing System and Information Scanout Employing Checksums for Error Detection" assigned to same assignee as the present invention.

In that patent, the data processing system includes an instruction-controlled principal apparatus and secondary apparatus for independently addressing and accessing points within the principal apparatus. A check-sum generator generates an actual checksum dependent upon the data values of selected points accessed within the principal apparatus. The particular set of points accessed in controlled by the secondary apparatus. The secondary apparatus stores an expected check sum for comparison with the actual checksum. If a comparison indicates that the actual checksum differs from the expected checksum, a fault is indicated within the set of points used in forming the checksum.

Once a fault has been detected through comparisons of actual and expected check sums, it is possible to further analyze the set of points which entered into the checksum to determine what subset of points is the source of the fault. The set of points or the subset of points accessed to form a checksum is controlled by the secondary apparatus.

While the checksum mechanism of U.S. Pat. No. 4,132,243 has proved very useful, it still has the problem that it requires storage of a large number of expected checksums to reflect the many error-free states of the computer. Furthermore, if improvements and changes to the circuitry and operation of the system mandate that the expected checksums change. Accordingly, keeping track of the expected checksums is somewhat of a burden which is undesirable.

Recent data processing systems have included diagnostic scanout capabilities which help locate errors in data processing systems. One such scanout system is described in U.S. Pat. No. 4,244,019 entitled "Data Processing System Including A Program-Executing Primary System" assigned to the same assignee as the present invention.

U.S. Pat. No. 4,244,019 provides a mechanism for scanout of all designed locations within a data processing system, independently of the normal data paths of that system. This scanout ability is of significant value in locating errors, and each location which has an error can be examined independently. However, the ability to examine thousands of locations within a data processing system does not assist in a quick location of the errors without further information as to which locations may be the cause of the errors. Although the above error checking and locating techniques have proved useful, there is a need for still improved error checking and locating techniques within data processing systems.

SUMMARY OF THE INVENTION

The present invention is an error-tracking unit within a data processing system. Each data location to be checked for error and to be located in the case of an error is provided with error detection circuitry. Each data location is additionally provided with an error history register for storing an error signal. When the error-detecting circuit detects an error, the error history register is enabled to store the error signal. Whenever an error is detected, the error history registers are inhibited from further change so that errors are not propagated. The error detection also causes a machine check signal which, in general, prevents the data processing system from normal processing.

The data locations to be error detected and error located are organized into a hierarchy of sets and subsets within the data processing system. In a three-level hierarchy the subsets are named sections, blocks, and units. Each of the data locations in a section have their error detecting signal lines combined and encoded to form a section error signal. The section error signals from a plurality of sections in turn are combined to form a block error signal. A plurality of block error signals are combined to form a unit error signal.

In one embodiment, groups of error signals from sections, blocks and units are encoded at each level to reduce the number of error signals employed.

Under the condition that a single data location causes an error, the error signal will be propagated through the subsets. For example, a data location error signal will cause a section error signal which in turn will cause a block error signal which in turn will cause a unit error signal. The error signals identify where in the system that the error is located. The unit error signal identifies one of a number of units, the block error signal identifies one of a number of blocks in the unit, and the section error signal identifies one of a number of sections in a block.

The present invention freezes the error history registers in the same cycle that an error is detected. In this way, propagation of errors throughout the system is minimized. The grouping and encoding of locations to be checked provides a track which allows the error location to be easily identified.

In accordance with the above summary, the present invention achieves the objective of providing an improved error detecting and tracking mechanism within a data processing system.

Additional objects and features of the invention will appear from the following description in which the preferred embodiments of the invention have been set forth in detail in conjunction with the drawings.

DETAILED DESCRIPTION

Figure 1:
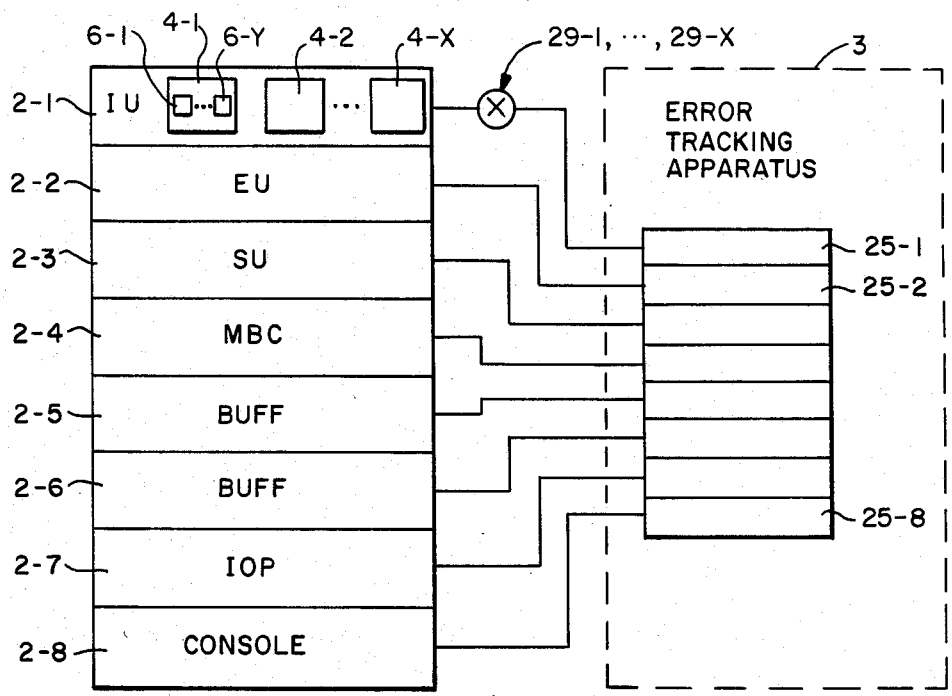
FIG. 1 depicts a data processing system organized into units, groups and sections and including an error tracking apparatus.

In FIG. 1, a data processing system 1 includes a number of units 2-1, 2-2, . . . ,2-8. The system 1 is for example a high performance data processing system such as the Amdahl 580 System. In addition to the normal circuits within the system 1, an error tracking apparatus 3 is provided for detecting and tracking errors within the units 2-1 thru 2-8.

In FIG. 1, each of the units 2 is formed by a number blocks 4. For example, the blocks typically correspond to the circuit chips on a multi-chip carrier (MCC). In FIG.1, the unit 2-1 includes MCC's or blocks 4-1, 4-2, . . . ,4-X. Each of the other units 2-2, . . . ,2-8 also includes similar blocks.

Figure 2:
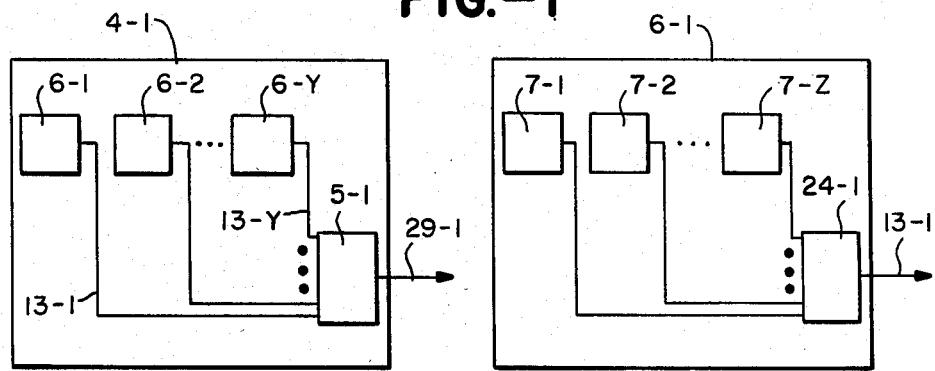
FIG. 2 depicts further details of a typical one of the units of FIG. 1 orginized into blocks.

In FIG. 2, a typical ones of the blocks 4-1, . . . ,4-X within the system of FIG.1 are shown. Each block includes sections of which sections 6-1, . . . ,6-Y are typical. The blocks also include block error tracking apparatus 5-1, . . . ,5-X which provide the block error signal lines 29-1, . . . ,29-X, respectively.

Figure 3:
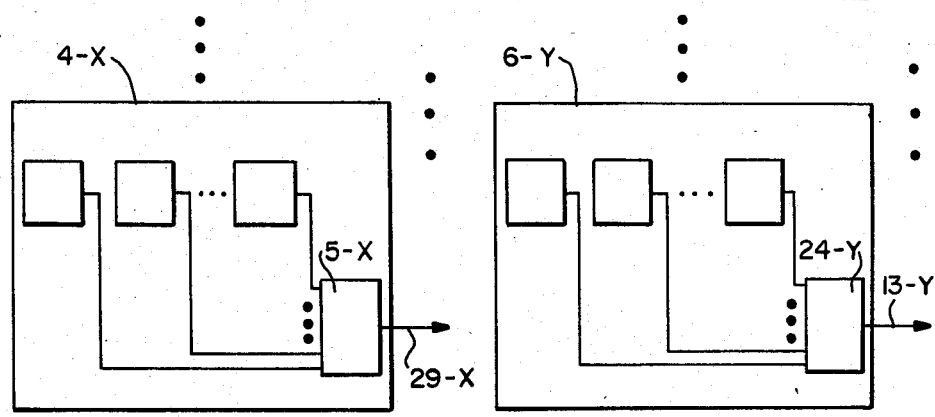
FIG. 3 depicts further details of a typical one of the blocks of FIG. 2 organized into sections.

In FIG. 3, typical ones of the sections 6-1, . . . ,6-Y of FIG.2 are shown. Each section includes a number of data locations of which 7-1, 7-2, . . . ,7-Z are typical. The data locations include register locations, memory locations, control locations and other similar locations throughout the data processing system. The sections include the section error-tracking apparatus 24-1, . . . ,24-Y which provide the section error signals 13-1, . . . ,13-Y.

Figure 4:
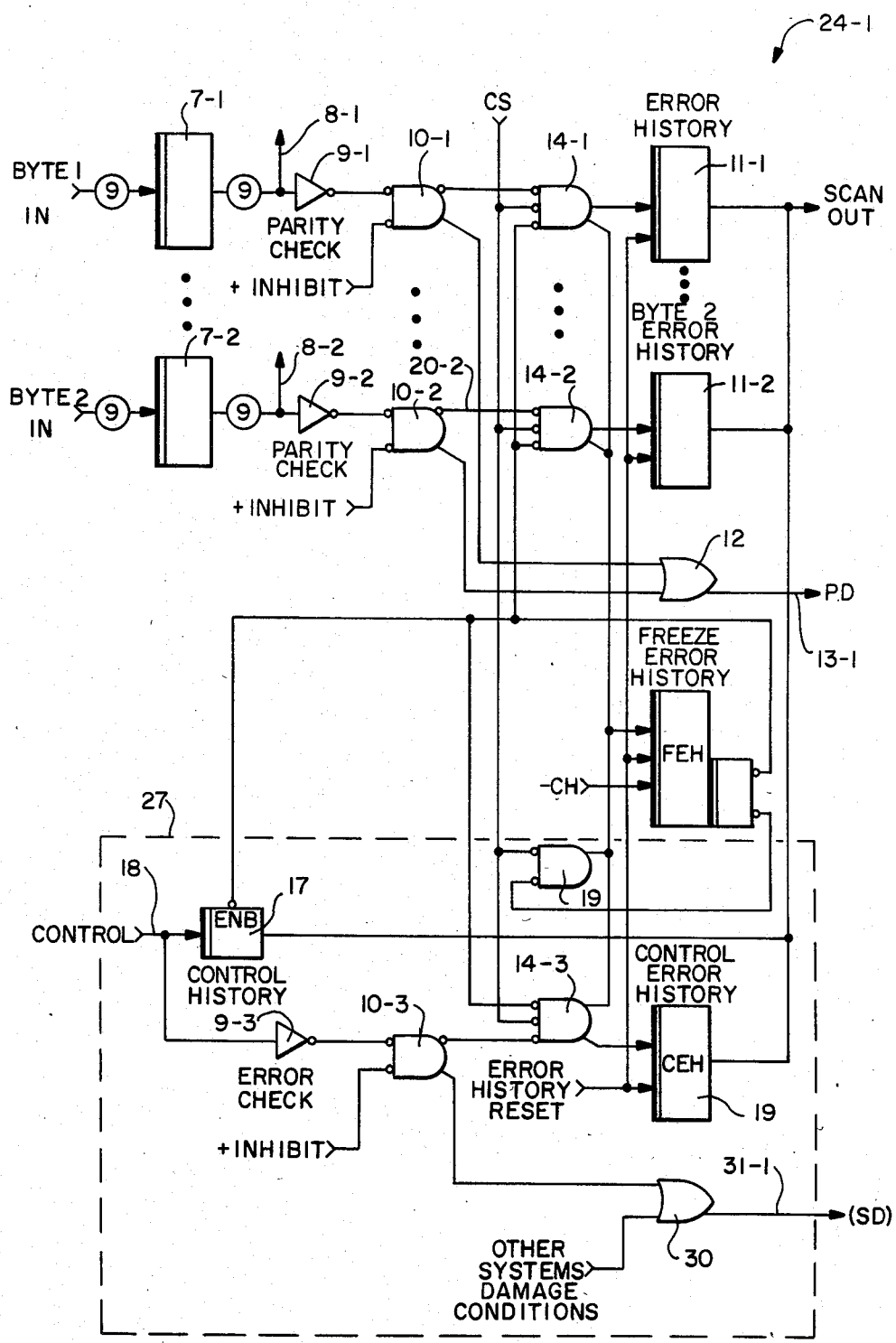
FIG. 4 depicts a schematic representation of the error tracking apparatus of the present invention within one section.

In FIG. 4, two register locations 7-1 and 7-2, together with the corresponding section error-tracking apparatus 24-1 in a section 6-1 of FIG.3 are shown. In FIG. 4, the location 7-1 is a 9-bit register representing byte 1. Data location 7-1 is a location within section 6-1, within block 4-1, within unit 2-1 (see FIGS.1, 2 and 3). The output bus 8-1 from the register 7-1 connects, in the FIG. 1 system, to some normal data location (not shown). In a similar manner, the output 8-2 from register 7-2 connects on bus 8-2 to some normal location (not shown) in the system of FIG. 1.

The registers 7-1 and 7-2 are merely examples of many more data locations 7-1, 7-2, . . . ,7-Z throughout the system of FIG. 1.

In FIG. 4, section error tracking apparatus 24-1 (part of the error tracking apparatus 3 of FIG. 1) includes an error detector. In the FIG. 4 example, the error detector is a parity checker 9-1 which checks the parity of the data in the register 7-1 and the parity checker 9-2 which checks the parity of.the data in register 7-2. The output from checkers 9-1 and 9-2 are asserted if a parity error occurs. Gates 10-1 and 10-2 propagate one of their outputs 20-1 and 20-2 to the OR Gate 12 which asserts a processing damage (PD) signal on line 13-1 if any parity error is detected. The processing damage (PD) signal on line 13-1 is connected to the FIG. 1 system in a conventional manner which, for a typical operation, causes the system to generate a machine check signal.

In the usual operation, a machine check signal will stop the clocks in one or more of the units of FIG.1 and control will be transferred to the console unit 2-8. Typically, the console unit 2-8 is notified of a machine check condition.

In one mode of operation, the console scans the system after the clocks have been stopped to determine the location of the error causing circuit. In another mode of operation, the console is notified of the machine check condition but the system clocks are not stopped and processing continues. These scanning functions are similar to those described in U.S. Pat. Nos. 4,244,019 and 4,142 243 referenced above.

In FIG. 4, the other outputs from the gates 10-1 and 10-2 connect through the gates 14-1 and 14-2 to the error history registers 11-1 and 11-2, respectively. Gates 14-1, and 14-2 must be enabled by the clock signal, -CS, and the absence of a freeze signal on line 16 from freeze latch 15. The error history registers 11-1 and 11-2 latch any parity error signal generated by the parity checkers 9-1 and 9-2, respectively, when gates 14-1 and 14-2 are enabled. Accordingly, the generation of a parity error signal becomes immediately latched into one of the error history latches 11-1 or 11-2. At the same time, processing damage signal line 13-1 will cause the clock signals in the system of FIG. 1 to be stopped so that the generation of further errors as a result of the original error is inhibited.

The freeze error history (FEH) latch 15 receives an input from all of the gates 14-1, . . . ,14-2 and becomes latched whenever a parity error is detected. When the freeze error latch 15 is latched, its output on line 16 is input to the gates 14-1 and 14-2 to inhibit any further latching of an error signal into the error history registers 11-1 and 11-2. Accordingly, after the first parity error signal is generated, the gates 14-1 and 14-2 are inhibited from propagating any additional error signals to the error history latches 11-1 and 11-2. In FIG. 4, the register 17 is a control history register which stores the state of a control signal, CONTROL, on line 18 at the time that any error is detected. An error checker 9-3 detects the control signal on line 18 to detect if there is an error condition. The gate 10-3 propagates any error signal from the error checker 9-3 to the gate 14-3. Another output from gate 10-3 connects to OR gate 30 to provide the system damage (SD) error signal on line 31-1. Gate 14-3 when enabled, like gates 14-1 and 14-2, will cause the freeze error history latch 15 to be set. Also, one output from gate 14-3 latches the control error history signal into the control error history register 19.

Figure 5:
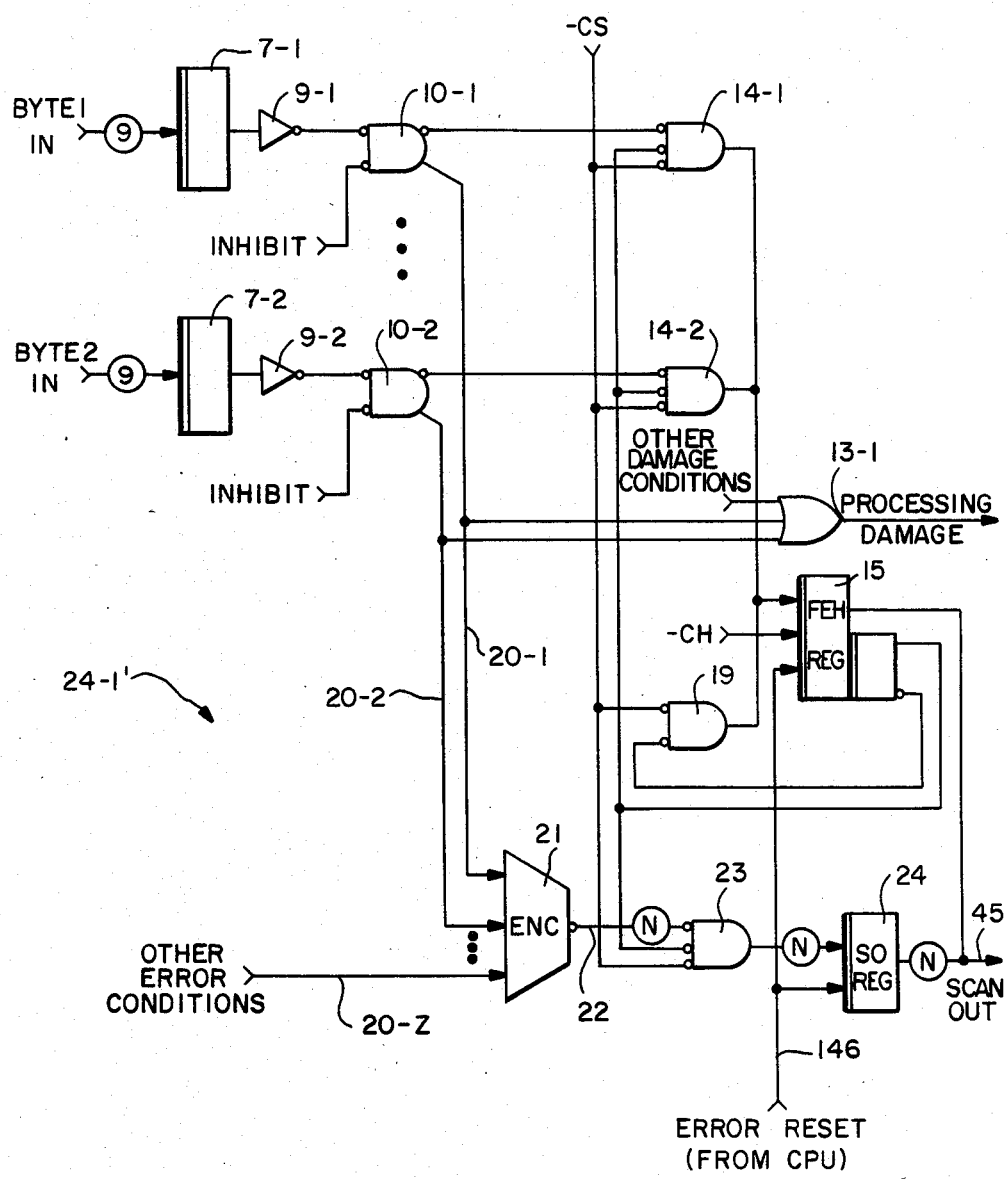
FIG. 5 depicts another embodiment of an error tracking apparatus in one section in which the error signals are encoded.

In FIG. 5, a similar and alternate structure to that of FIG. 4 is shown. FIG. 5 differs from FIG. 4 however, in that the error signals on lines 20-1 and 20-2 from the gates 10-1 and 10-2 also connect into an encoder 21. The encoder 21 encodes any error singals on lines 20-1 through 20-Z to provide an N-bit encoded error signal on line 22. The N-Way gate 23, when enabled by the absence of a freeze error output from latch 15 and by the clock signal, propagates the encoded error signal into latch 24. The encoded value encoded by the encoder 21 identifies which one of the registers 7-1, . . . , 7-Z causes the error. While only two registers 7-1 and 7-2 are shown, the three dots (". . . ") indicate that many registers or other data locations 7-1, . . . ,7-Z are intended.

In FIG. 5, the (scanout) register 24 stores the encoded error representation. Register 24 includes N bits and therefore represents $2^N$ different error signals. For example, if seven error detectors 9-1, 9-2, . . . ,9-7 exist and seven gates 10-1, 10-2, . . . ,10-7 exist, then Z is equal to 7. Encoder 21 therefore has the seven input lines 21-1, 21-2, . . . ,21-7. The encoder 21 encodes the seven inputs into three lines, that is, N is equal to 3. An all 0's code indicates no error. The gate 23 is three deep, one for each of the lines from encoder 21. The gate 23 provides three inputs to the 3-bit register 24. For a binary representation, the error detectors 9-1 through 9-7 are identified by the binary representations 001, . . . ,111. In an example where the parity detector 9-2 detects a parity error in the data in data location 7-2, the encoder 21 will encode a binary 010 into the scanout register 24. The 3-bit bus 45 from the scanout register 24 can be interrogated by any conventional scanout circuits. For example, conventional scanout circuits are shown in U.S. Pat. No. 4,244,019 referenced above.

An alternate embodiment for multi-bit errors detected in the same cyle can use additional output lines to identify the multi-bit error condition and the location of the errors.

If the binary number stored in the scanout register 24 is 010, it signifies that the parity error occurred in the data location of register 7-2. If the binary number stored in scanout register 24 is 001, it indicates that the parity error occurred in the register 7-1.

In FIG. 5, the freeze error history (FEH) register 15 and scanout register (SO) 24 are each reset by the error reset signal on line 46.

In FIG. 5, only the processing damage line 13-1 and the scanout bus 45 are shown.

The processing damage circuitry of FIG. 5 can be combined with the control error detector and history unit 27 of FIG. 4. In comparing the FIG. 4 and FIG. 5 implementation, note that the N-bit bus 45 from SO register 24 is only three bits. By way of distribution, in the FIG. 4 embodiedment, there is an output from each of the eight registers 11-1, 11-2, . . . ,11-8 in a comparable example. The encoded scanout output reduces the number of outputs from eight to three.

Figure 6:
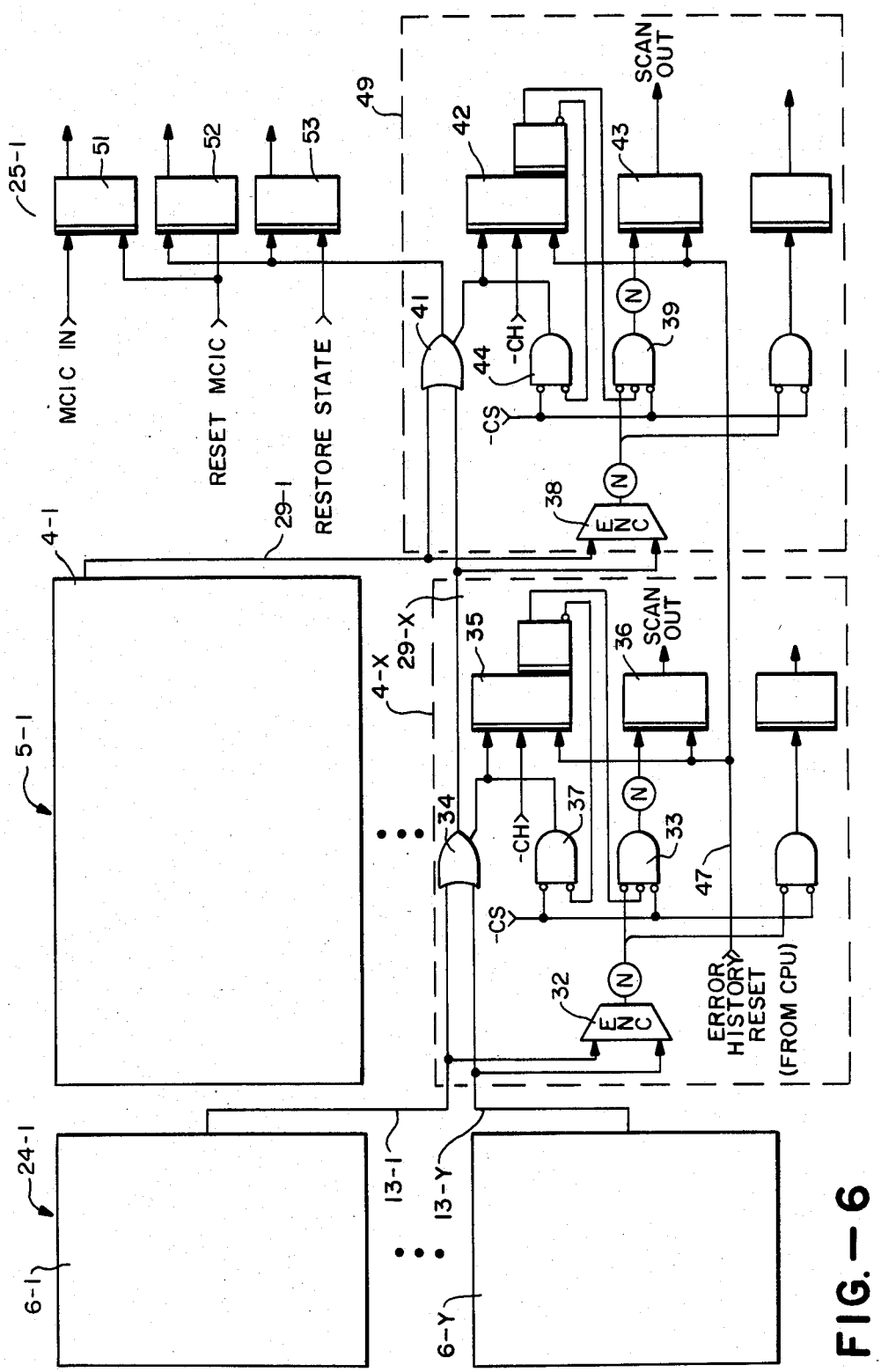
FIG. 6 depicts the error tracking apparatus of FIG. 4 in a hierarchy in which section error signals are combined to form block error signals which in turn are combined to form unit error signals.

In FIG. 6, further details of the error tracking hierarchy are shown. The system includes three groups of circuits, including the section level, the block level, and the unit level. The section level is composed of a plurality of sections. Particularly, the sections 6-1, . . . ,6-Y are each like the section shown in FIG. 4. Each of the sections provides the section error signal lines 13-1, . . . ,13-Y as inputs to one of the blocks in the block level apparatus 5-1. The example shown, the error signal lines 13-1, . . . ,13-Y are all input to the block 4-X. Block 4-X is typical of blocks 4-1, . . . ,4-X. Each of those blocks receives inputs from a group of sectios like the sections 6-1, . . . ,6-Y.

In FIG. 6, block 4-X is shown in detail as typical. The block 4-X includes an OR gate 34 which receives the section error signal lines 13-1, . . . ,13-Y. Whenever a section error signal occurs, OR gate 34 provides a processing damage signal on output line 29-X. Also, gate 34 provides a latching signal into freeze error history (FEH) register 35. Register 37 is like the register 15 of FIGS. 4 and 5. FEH register 35 latches the section error signal unless the clock signal, -CS, through gate 35 is inhibited by the output from FEH register 35.

In FIG. 6, encoder 32 encodes Y-inputs 13-1, . . . ,13-Y to form an N-bit output to the N-way gate 33. Gate 33 provides an N-bit bus as an input to the N-bit scanout (SO) register 36. The scanout register 36 is like the scanout register 24 of FIG. 5. The freeze error history latch 35 and the scanout register 36 are reset by the error history reset line 47.

Each of the blocks 4-1 through 4-X in FIG. 6 provides a block error signal output. The block error signal lines 29-1, . . . 29-X connect to the unit level tracking apparatus 25-1.

In FIG. 6, the unit tracking apparatus 49 is shown for the unit 2-1 of FIG. 1 and is typical of the unit tracking apparatus of the units 2-1 through 2-8.

In FIG. 6, the OR gate 41 collects the block error signal lines 29-1 through 29-X from the group of blocks 4-1 through 4-X. Whenever any of the block error signal lines signifies an error, OR gate 41 latches the freeze error history (FEH) latch 42, provided the clock signal is enabled by the gate 44.

In FIG. 6, the encoder 38 encodes the block error signal lines 29-1 through 29-X into an N-bit signal to the N-way gate 39. Gate 39 in turn stores the encoded block error signals into the scanout (SO) register 43. Any error output signal from the OR gate 41 is also latched into the registers 52 and 53 for controlling the processing which can be carried out by the machine check and scanout circuitry.

The operation of the FIG. 6 apparatus is as follows. Upon the detection of an error by any of the error detection circuits within any of the sections 6-1 through 6-Y, the OR gate 34 will receive a section error signal. The section error signal will be latched into the latch 35 and an encoded representation identifying that error signal is stored in the scanout register 36. The OR gate 34 also causes the OR gate 41 to receive a block error signal which is latched into the FEH latch 42. At the same time, the encoder 38 encodes an identification of that block error signal in the SO register 43.

By interrogating (for example, with scanout circuitry) the SO register 43 and the SO register 36, the particular block, for example block 4-X, and the particular section, for example, section 6-1, which caused the error can be identified. In the FIG. 6 example, no encoder was utilized within the section, and therefore the particular data location, referring to FIG. 4, for the registers 7-1 through 7-X which caused the error is not immediately available. Therefore each of the registers 11-1 through 11-X must be interrogated to see which one caused the error. In an alternate embodiment, the FIG. 5 section with an encoder 21 can be employed. Only the scanout register 24 would need interrogation to uniquely identify the data location causing an error.

In the FIG. 6 description, for clarity, only the processing damage portion of the circuitry is shown at the block and unit levels. However, system damage resulting from control sections like that shown in FIG. 4 can be incorporated in the block and unit levels in the same way that the processing damage sections are shown. The control data locations can be encoded and identified in the same way that the data lines are encoded in the example described.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a data processing system including a plurality of data locations, an error tracking apparatus comprising:
   a plurality of error detection means, each for detecting errors in data locations, and generating a data error signal upon the occurrence of an error;
   a plurality of storage means, each connected to store a data error signal from a corresponding data location upon the detection of an error and adapted to be read during error processing;
   an error freeze latch connected to be set by a data error signal generated by said error detection means, said error freeze latch connected to inhibit said storage means from changing state after being set by the data error signal;
   a first combining means for combining the error signals from a section of said data locations to form a section error signal representing an error in any of said data locations within said section; and
   a second combining means for combining a block of said section error signals to form a block error signal indicating an error in a data location within said block of sections, whereby the block and section of the data location causing the error is identified.

2. The apparatus of claim 1 wherein said storage means includes means to store the data error signal in the same cycle as the error is detected.

3. The apparatus of claim 1 including scanout means connected to distribute data error signals stored in said storage means for error processing.

4. The apparatus of claim 1 further including third combining means for combining a plurality of block error signals from a group of blocks to form a unit error signal indicating an error in a data location within said group of blocks whereby the unit, block and section of the data location causing the error is identified.

5. The apparatus of claim 4 wherein said third combining means for combining a plurality of said block error signals includes an encoder to provide an encoded representation of said block error signals.

6. The apparatus of claim 4 wherein said first combining means for combining the error signal from a group of said data locations includes an encoder means for encoding said section error signals to form an encoded representation of said section error signals.

* * * * *